(12) United States Patent
Sher

(10) Patent No.: US 8,263,165 B2
(45) Date of Patent: Sep. 11, 2012

(54) PRODUCTION OF CONSUMABLE ALCOHOLS AND COMPONENTS THEREOF

(76) Inventor: Jaimes Sher, Albuquerque, NM (US)

( * ) Notice: Subject to any disclaimer, the term of this patent is extended or adjusted under 35 U.S.C. 154(b) by 1599 days.

(21) Appl. No.: 11/034,525

(22) Filed: Jan. 12, 2005

(65) Prior Publication Data

US 2005/0158798 A1   Jul. 21, 2005

Related U.S. Application Data

(60) Provisional application No. 60/536,117, filed on Jan. 13, 2004.

(51) Int. Cl.
*C12H 1/14* (2006.01)
(52) U.S. Cl. ............ 426/592; 426/590; 426/11; 426/15; 435/4; 435/7.1; 435/161
(58) Field of Classification Search .................. 426/592; 435/7.1, 161
See application file for complete search history.

(56) References Cited

U.S. PATENT DOCUMENTS

| 6,045,671 A | 4/2000 | Wu et al. |
| 6,667,009 B1 | 12/2003 | Desrosiers et al. |
| 2005/0104589 A1 | 5/2005 | Augustine et al. |

FOREIGN PATENT DOCUMENTS

| PT | 102177 | * 12/1999 |
| UA | 52490 | * 12/2002 |

OTHER PUBLICATIONS

Amerine et al. Table Wines, 1951, University of California Press, Second Edition, pp. 565-567.*
Dominic Wong and George Robertson, Applying Combinatorial Chemistry and Biology to Food Research, J. Agric. Food Chem., 2004, 52 (24), pp. 7187-7198.*
Wong D.W.S, Robertson, G.H. Combinatorial Chemistry and Its Application in Agricalture and Food, 1999, pp. 91-105.*
Magnetic Resonance Sniffs Out Bad Wines physicsworld.com/cws/article/print/1336 Nov. 1, 1998.*
High Throughput Screening for Food Safety a Reality Nov. 12, 2002.*
Khan, J.A. and Vulfson, E.N. Combinatorial Chemistry in Food Research, 2003, pp. 569-574.*
Berger et al. Combinatorial Approach to Flavor Analysis. 2. Olfactory Investigation of a Library of S-Methyl Thioesters and Sensory Evaluation of Selected Components. J. Agric. Food Chem. 1999, 47, 3274-3279.*
English language translation of Ukraine Patent UA-52490 to Zadorozhnaya et al.
Foss Brochures.

* cited by examiner

*Primary Examiner* — Vera Stulii

(57) ABSTRACT

The invention is directed to a process for producing consumable alcohols and components thereof, in particular for producing consumable alcohols and components thereof using high throughput rapid screening and production of combinatorial libraries of consumable alcohols and components. In particular, the consumable alcohol is wine, Scotch, cognac, ports, beer, gin, vodka, rum, sherry, champagne, tequila, and the like and components thereof. Most particularly, the consumable alcohol is wine, wine blends, and components thereof.

20 Claims, No Drawings

PRODUCTION OF CONSUMABLE ALCOHOLS AND COMPONENTS THEREOF

CROSS REFERENCE TO RELATED APPLICATION

This patent application claims the benefit of priority from U.S. Provisional Patent Application No. 60/536,117 filed Jan. 13, 2004, which is herein fully incorporated by reference.

FIELD OF THE INVENTION

This invention is directed to a process for the production of consumable alcohols and components thereof, especially, a process for the production of consumable alcohols and components thereof using high throughput rapid screening and production of consumable alcohol and components thereof. In particular, the consumable alcohol is wine, scotch, cognac, port, vodka, rum, gin, grappa, sherry, champagne, tequila, beer, and the like, and components thereof. Most particularly, the consumable alcohol is wine, wine blends, and components thereof.

BACKGROUND OF THE INVENTION

There is substantial research actively directed toward the discovery and optimization of materials for a wide range of applications. Combinatorial science refers generally to methods for synthesizing a collection of chemically diverse materials, and to methods for rapidly testing or screening this collection of materials for desirable performance characteristics and properties. In comparison to traditional materials science research, combinatorial materials research can effectively evaluate much larger numbers of compounds, mixtures and blends in a much shorter period of time.

Winemaking is very challenging, and is often said to be dependent on many uncontrollable variables. For example, changes in the weather or climate affect the quality of the grapes used to make wines. Also, the types of soil in which the grape vines are grown can vary grape quality. Obviously, the skill of the winemaker is important, but it is said that the quality of the grape is what largely determines the quality of the wine produced.

Today winemakers blend different variety of wines to tailor the quality of the final wine composition that is then bottled and sold. These types of wines are often referred to as Meritage wines. These blends of wines can be blends of red and/or white wines, typically the same color. Blending is true for many types of consumable alcohols, even for example, blended Scotch whiskies, which are blends of differently aged Scotch whiskies. Furthermore, many consumable alcohols because of various laws, are classified, entitled to be named, or designated to be from a particular region, considered as being a pure, unblended, or from a single grape variety. Often this depends on the total percentage of for example the variety of grape the consumable alcohol sold contains. Blending these consumable alcohols takes a significant amount of time, expertise, and expense. The variance in consumable alcohol(s), particularly in wines, is because the starting materials used in producing wine or blends of wines are inconsistent due to the particular variety of grape, the region in which the grapes are grown, and the varying weather or climate; and then, ultimately how, and under what conditions, the wine or blends of wines are made and stored/cellared.

Also, where the consumable alcohol is wine, even if the grape variety and wine are consistent, much effort goes into finding the best combination of consumable alcohols and components thereof to make preferably the finest wines.

It would be useful to provide a way to test various consumable alcohol and alcohol blends of consumable alcohols, blends thereof, and components thereof, on a rapid basis, and substantially reduce the time it takes to produce a consumable alcohol, in particular a good wine, preferably a great wine. It would also be useful to provide a rapid way of screening conditions of manufacture, storage and stability of consumable alcohols, in particular wines. Also, it would be useful to provide a way to reduce the need for reliance on testing sensory properties of a consumable alcohol such as taste and smell.

SUMMARY OF THE INVENTION

The invention is directed to using combinatorial technology to produce high quality consumable alcohols, in particular wine and wine blends.

In one embodiment, the invention relates to a combinatorial method of making a library of consumable alcohols, the combinatorial method comprising the steps of: (a) providing one or more vessels(s) or mixing vessel(s); (b) introducing one or more consumable alcohol(s), preferably wine(s) or component(s) thereof into the one or more vessel(s) or one or more mixing vessel(s) forming one or more blend(s); and (c) testing or measuring a property of the one or more blend(s) to produce the library of consumable alcohols. In this embodiment, in step (a) two or more vessels or mixing vessels are provided, preferably five or more vessels or mixing vessels, more preferably 10 or more vessels or mixing vessels, even more preferably 20 or more vessels or mixing vessels, yet even more preferably 50 or more vessels or mixing vessels, and most preferably 100 or more vessels or mixing vessels. Also, in a preferred embodiment, the library of consumable alcohol is a combinational library of red and/or white wines, and or mixtures thereof. In one embodiment, the blend(s) are the red wine blends that comprise 50% or more of Cabernet Sauvignon, and the white wine blends comprise 50% or more of Chardonnay. The most common properties tested or measured include pH, Brix, titratable acidity and color. In a most preferred embodiment, the blends are tested using NMR, preferably, the method further comprises the step of comparing the NMR of the one or more blend(s) with that of a standard consumable alcohol, such as a high quality wine, blend of wines, or a high quality Scotch whisky or a blend of Scotch whiskey.

In another embodiment, the invention is directed to a combinatorial method of making a combinatorial library of wines comprising: (a) providing one or more mixing vessel(s); (b) introducing one or more wine(s) or components thereof into the one or more mixing vessel(s) forming one or more wine blend(s); and (c) introducing or changing, preferably over time, at least one variable affecting the one or more wine blend(s) to produce the combinatorial library of wine. In a preferred embodiment, the one or more wine(s) are selected from one or more of the group consisting of red wines and white wines, and combinations thereof. Preferably, the one or more wine blends contain at least 50% Cabernet Sauvignon or at least 50% Chardonnay, or mixtures thereof.

In yet another embodiment, the invention relates to a method of making a library of consumable alcohols, the method comprising the steps of: (a) providing at least two vessels; (b) introducing one or more consumable alcohol(s) or components thereof into the at least two vessels forming one or more blend(s); and (c) testing or measuring a property of the one or more blend(s) to produce the combinatorial library of consumable alcohols. In one preferred embodiment, the consumable alcohol is a wine, preferably a red wine, or other wine blends. In another preferred embodiment, the consumable alcohol is a Scotch whiskey. Also, in this embodiment, the method of the invention provides for the additional step wherein one or more blend(s) property or properties tested or measured in step (c) is compared to another consumable alcohol, preferably a high quality consumable alcohol, more preferably a high quality wine having a 90 points or greater rating based on Wine Spectator's or Robert Parker's rating system, discussed later in this patent specification. In the most preferred embodiment, the one or more blend(s) property or properties tested or measured in step (c) is then modified by well known techniques such as by adding additional consumable alcohol(s), wine or wine blends, adding water, acids, sugars, flavorings, pigments, tannins, metal ions, antioxidants, wood(s) or additional bacteria, additional yeast, adjusting various other properties such as stirring rates, temperature, etc. to substantially match one or more property or properties of the consumable alcohol, preferably a high quality consumable alcohol, and most preferably a high quality wine.

In even still another embodiment, the invention is directed to a method for producing a consumable alcohol composition, the method comprising the steps of: (a) obtaining one or more property or properties of a standard consumable alcohol or component thereof, (b) introducing one or more feed material(s) to one or more vessel(s) forming one or more consumable alcohol blend(s); (c) obtaining one or more property or properties of the one or more consumable alcohol blend(s); (d) comparing the one or more property or properties of the one or more consumable alcohol blend(s) with the same or similar one or more property or properties of the standard consumable alcohol, a component thereof, or one or more of the consumable alcohol blend(s); and (e) adjusting or modifying the same or similar one or more property or properties of the one or more consumable alcohol blend(s) to approximate, preferably substantially match, the same or similar property or properties of the one or more standard consumable alcohol or one or more consumable alcohol blend(s). In one embodiment, the standard consumable alcohol or consumable alcohol blend(s) is a wine or a component thereof or a Scotch whiskey or a component thereof. In the embodiment wherein the feed material(s) is wine or a component thereof, for example a must, it is preferable that the one or more consumable alcohol blend(s) is red wine and/or a white wine, preferably a red wine. In a preferred embodiment, the number of vessels is greater than two, preferably greater than five, more preferably greater than 10, even more preferably greater than 15, still even more preferably greater than 20, and most preferably greater than 50. In a preferred embodiment of this embodiment, the one or more same or similar property or properties of the standard consumable alcohol is utilized.

In one embodiment, using the combinatorial process of the invention described above, the production or testing or high-grading or comparison or matching of consumable alcohols, preferably a wine, are accomplished in less than a month, preferably less than three weeks, more preferably in less than two weeks, and most preferably in less than one week. In the embodiment in which the invention is utilized to match a wine or wine blend with a standard, the matching is substantially accomplished in less than a month, preferably in less than three weeks, more preferably in less than two weeks, and most preferably in under one week.

DETAILED DESCRIPTION OF THE INVENTION

Introduction

This invention is directed to a process for the high throughput rapid screening and production of consumable alcohols, in particular wines and Scotch whiskey, and blends thereof. A consumable alcohol is an alcohol that is safe for human consumption, unlike pure methanol. The invention uses combinatorial technology to perform multiple experiments or tests, tens of, even hundreds of thousands of tests in a relatively short period to increase or maximize the ability of yielding a consumable alcohol, more particularly a wine or blend of wines that possess a desired set of properties and characteristics. In addition, the invention provides for the testing of multiple conditions of manufacture and storage of consumable alcohols, especially wines and blends thereof. Furthermore, the invention also provides for a substantial reduction in the quantity of feed materials needed to test or produce consumable alcohol blends because of the very nature of combinatorial technology providing the ability to use very small quantities, even drops, to create blends and compare them. Also, the invention provides for a substantial reduction in waste of consumable alcohols in the testing processes utilized today. Additionally, the time to determine a modification or adjustment of the consumable alcohol using the invention is also substantially reduced.

The invention further provides for the rapid screening of wines and/or to produce wines the same as or similar to wine of any characteristic, type, from any region, and from any period or time. The invention could be used to produce rare wines, or limited production wines on a substantially larger scale than otherwise would be possible. Most vineyards have one or a few wine makers, the invention provides for testing hundreds or even thousand's of combinations of wines and blends in a short period of time not heretofore been possible. In addition, a winemaker can only taste so much wine in one day. This invention will further provide for the winemaker to only test those wines that would be anticipated to be of high quality based on the testing using the invention. In addition, it is believed that the invention would be useful in high-grading less high quality wines on a rapid basis. The ability to test numerous wines or wine blends on a rapid basis provides winemakers advantages not heretofore possible.

In addition, the invention provides the ability to produce wine anywhere in the world regardless of where the grapes are grown or the wine produced. It is well known that wines are purchasable in bulk, and therefore, using this invention one could produce a great wine more easily, without having to be concerned about starting with the best grapes. Lastly, when blending Scotch whiskey and the like, a distiller would more easily be able to blend precisely various aged Scotch malt whisky, and many other consumable alcohols or combination thereof, or even consumable vinegars such as balsamic vinegars and consumable oils such as olive oils, or any combination thereof.

The invention in one embodiment includes the blending of two or more consumable alcohols or components thereof, more particularly the blending of two or more red wines, two or more white wines, one or more red wines with one or more white wines, two or more Scotch's, preferably differently aged Scotch's, two or more beers, preferably different types of beers, and any other blend of two or more consumable alcohols.

In a preferred embodiment, a feed material, a consumable alcohol or component thereof, such as wine, Scotch, beer etc. are readily available, and the manufacture of consumable alcohols are also well known. Most consumable alcohols and components thereof including wine manufacturing equipment are also readily available. In one preferred embodiment, the feed material, for example the grapes used to make wine, are grown using hydroponics to improve feed material quality, yield, and uniformity. In addition, the hydroponics would utilize various nutrients for producing superior feed materials, such as grapes.

Grape Varieties and Wines

There are a variety of grapes grown throughout the world that would be useful in this invention, these include red and white Vinifera and hybrid grapes. Non-limiting examples of white grapes include Riesling, Sauvignon Blanc, Palamino, Chardonnay, Sémillion, Muscat, Silvaner, Pinot Blanc, Saint Emilion, Sylvaner, Müller-Thurgau, and Gewürztraminer. Non-limiting examples of red grapes include Gamay, Pinot Noir, Tempranillo, Sangiovese, Merlot, Zinfandel, Cabernet Sauvignon, Nebbiolo, Syrah, Petit Sirah, Malbec, Shiraz, Garnacha, Páis Grenache, Mourvédre, Picpoul, Terret, Counoise, Muscardin, Rioja, Barbera, Cabernet Franc, Carignane, Charbono, Tinto Madeira, Vaccarēse, Picordin, Cinsault, Clairette, Roussanne, Bourboulenc, Dolcetto, and Barbera. Most all of these and many other grape varieties, must(s) and wines are discussed in Zraly, *Windows of the World, Complete Wine Course*, Millennium Edition, New York, N.Y., (Sterling Publishing) 2000, which is herein incorporated by reference in its entirety. Two or more of any of the above wines are utilized in the wine blends useful in this invention.

Wine blends in one embodiment include: blending wines from two or more grape varieties, from one grape variety grown in different locations, wines from two or more vintages, wines having different vinifications, wines from various casks, other components not from the grape or from the grape with one or more wine(s), and any combination thereof. Components not derived from the grape include various acids such as malic acid, yeasts, sugars such as fructose, woods such as oak, French oak, American oak, new barrels, old barrels, etc., components from the grape include grape skins, grape seeds, partially fermented grapes, grape juice, must, lees, etc.

In another embodiment the wine blends utilized is a blend of different consumable alcohols, preferably wines, most preferably red wines, from different growing regions or country in the world and/or different types, kinds, age of consumable alcohols. For example, blending a red wine from the Napa region with a red wine from the St. Helena region, blending a red wine from Burgundy with one from Bordeaux, blending a red wine from Oregon with a red one from Italy, a wine from France with a wine from Italy, a wine from Europe with a wine from the United States, a wine from Spain with a wine from Australia, and the like. Differently aged wines are typically blended to with raise the quality or combine a fresh or aged characteristic in a wine blend. Wines from various regions or locations are blended for the purposes of improving color, fragrance or flavor.

In one preferred embodiment, wines, preferably red wines, are blended such that the wines blended have two or more similar or the same properties or characteristics, for example pH and sugar content, more preferably three or more similar or the same properties or characteristics, and most preferably four or more similar or the same properties or characteristics. It is also best practice not to attempt to blend a contaminated wine or wine of substantially inferior quality with wine with an uncontaminated wine or a vastly superior wine.

In one embodiment, Merlot is used as a neutral red wine for blending with other red wines such as Cabernet Sauvignon, or Sauvignon Blanc as a neutral white wine for blending with Chardonnay. In one embodiment, a pre-blend is utilized as neutral component of wine for blending with wine such as grape juice, from for example a Thompson seedless grape, or the like.

In a preferred embodiment, the wine blends utilized include in particular blends of red wines, wherein more than 50% to less than 99% of the wine blend is Cabernet Sauvignon, preferably greater than 60%, more preferably greater than 65%, even more preferably greater than 70%, still even more preferably greater than 75% and most preferably greater than 80%. The remainder of the wine blend, up to 100% in this preferred embodiment is selected from one or more of the group consisting of Merlot, Cabernet Franc, Petit Verdot, Malbec, Nebbiolo, Mourvedre, Syrah, Shiraz, Gamay, Pinot Noir, Tempranillo, Sangiovese, Zinfandel, and/or a different Cabernet Sauvignon, one that has any different chemical characteristic, produced in different regions and/or different countries, and the like. In another preferred embodiment, the red wine blends utilized has between about 60% to about 90% Cabernet Sauvignon, about 5% to about 30% Merlot, about 5% to about 20% Cabernet Franc, and from about 0% to about 10% Petit Verdot, preferably the red wine blends utilized has between about 70% to about 85% Cabernet Sauvignon, about 5% to about 15% Merlot, about 5% to about 10% Cabernet Franc, and from about 0% to 5% Petit Verdot.

In one embodiment, the red wine blends utilized has between about 50% to 80% Zinfandel, preferably from about 55% to about 75%, and most preferably from about 60% to about 75%, and the remainder of the blend up to 100% includes one or more of wine selected from the group consisting of Cabernet Sauvignon, Gamay, Pinot Noir, Tempranillo, Sangiovese, Merlot, Zinfandel, Nebbiolo, Syrah, Petit Sirah, Malbec, more particularly, from 20% to 40% Cabernet Sauvignon, and from 1% to 10% Merlot.

In another preferred embodiment, the red wine blends utilized has between about 1% to 99% Cabernet Sauvignon, preferably from about 1% to about 50%, even more preferably from about 5% to about 30%, and yet even more preferably from about 5% to about 25%, and the remainder of the blend up to 100% includes one or more of wines selected from the group consisting of Gamay, Pinot Noir, Tempranillo, Sangiovese, Merlot, Zinfandel, Nebbiolo, Syrah, Petit Sirah, Malbec, Shiraz, Garnacha, Páis Grenache, Mourvédre, Picpoul, Terret, Counoise, Muscardin, Rioja, Barbera, Cabernet Franc, Carignane, Charbono, Tinto Madeira, Vaccarēse, Picordin, Cinsault, Clairette, Roussanne, Bourboulenc, Dolcetto, and Barbera.

In yet another embodiment, champagne, a wine blend, is used in the combinatorial process of this invention. Champagne is typically a blend of predominately Pinot noir and Chardonnay, and optionally an amount of up to 33% of the total wine blend of a Pinot Meunier.

Most of the world's best wines are blends such as for example growths of Graves and Medoc in Bordeaux. These wine blends, in particular wines of France, all comprise Cabernet Sauvignon and Merlot, with some comprising Petit Verdot and/or Malbec. For example, in one embodiment, these wine blends comprise from about 20% to 80% Cabernet Sauvignon, preferably about 60%, from 5% to about 60% Merlot, preferably 25%, from 0% to 15% Petite Verdot, preferably about 3%, and from 0% to 5% Malbec, preferably about 1%. In another embodiment, the wine blend comprises 0% to 30% Cabernet Sauvignon, preferably about 13%, from about 30% to 80% Merlot, preferably about 50%, and from 0% to 5% Malbec, preferably about 0%. In one preferred embodiment, the wine blend composition comprises from 80% to 99% Merlot, preferably 95%, and from about 1% to 20% Cabernet Franc, preferably about 5%. The red wines of Spain from the Rioja region, in one embodiment, are also blends of one or more of the variety group consisting of Grenache, Tempranillo, Mazuelo, and Graciano.

Beer Types

Most beer types around the world are classified as either a lager or an ale. The difference in the types of beer is largely attributable to the yeast used and the process conditions such as temperature and rate at which fermentation takes place. For example, lagers are brewed with bottom-fermenting yeast that ferments more slowly and at colder temperatures as opposed to ales being brewed with a top-fermenting yeast that provides for rapid fermentation at warmer temperatures. Lager beers tend to be paler, drier, and contain less alcohol than ales. Non-limiting examples of lager beers include Pilsner or pils beer, bock and marzen beers, pale or blonde beers. Non-limiting examples of ales include beers styles such as porters and stouts to pale ales and wheat beers. Ales tend to have a higher alcohol content and more complex than lagers.

Lager beers include for example the American Lager that is mass-produced and is watery with some flavor and having a low gravity; for example, the Original Gravity (OG) is 1.040 to 1.046, and a Finished Gravity (FG) of 1.006 to 1.010. Also, these light beers of American beers have an International Bittering Unit (IBU) of from about 5 to 17, a Standard Reference Method (SRM) of from 2 to 4, an alcohol content in percent by volume of from 3.5% to 4.5%, and non-limiting examples of these beers include Anheuser Busch's Budweiser and Coors Brewing Company, Coors Light.

Another lager style beer is Pilsner, which is traditionally a light colored beer. Pilsners are malty, sweet, and well-hopped beers with a caramel flavor, some bitterness, and good amount of carbonation. A Pilsner type beer has an OG of from 1.044 to 1.056, a FG of 1,014 to 1.020, IBU of from 35 to 45, a SRM of 3 to 5, an alcohol percent by volume of 4.0% to 5.0%, and non-limiting examples of these beers include Pizensky Prazdroj's Pilsner Urquell and Pivovar Velke Popovice's Kozal Pilsner.

A Pilsner type beer further includes a Bock beer that is a hearty beer with a high alcohol content, a pronounced malt flavor with some hop bitterness, and is matured for a long period of time during a second fermentation process. Doppelbock is a variant of a Bock beer with a higher gravity and a slightly higher alcohol content. Bock beer types typically have an OG of from 1.066 to 1.074, a FG of from 1.018 to 1.024, an IBU of 35 to 45, a SRM of 3 to 5, and alcohol content percentage by volume of 4.0% to 5.0%, and non-limiting examples include Pennsylvania's Brewing Company's Ste. Nick Bock, and Spaten-Franziskaner's Optimator.

Other lagers include Oktoberfest (Marzen) type beers that are usually amber in color, slightly heavier, somewhat sweet, and are usually stored from March through October in Germany and Austria. Marzen beers typically have an OG from 1.050 to 1.056, a FG of 1.012 to 1.020, an IBU of 18 to 25, a SRM of 35 to 15, an alcohol percentage by volume of 5.0% to 6.0%, and non-limiting examples include Paulaner-Salvator's Paulaner Octoberfest-Bier and Great Lakes Brewing Company's Eliot Ness. Another lager type beer is from Bavaria known as Helles type beer that is a pale lager, light in color, low in alcohol content and less of hop aroma as compared to a Pilsner or Pale Lager. Helles type beers typically have an OG of from 1.044 to 1.050, a FG of from 1.008 to 1.012, a IBU of 18 to 25, a SRM of 3 to 5, and alcohol percentage by volume of 3.8% to 5.0%, and non-limiting examples include Brauerel Weihenstephaner's Weihenstephaner Original and Hofbrauhaus' Hofbrau Original. Dunkel is another lager type beer know as German dark beer that is similar to a Helles type beer with an additional roasted malt added for color and chocolate taste. Dunkel type beers typically have an OG of from 1.052 to 1.056, a FG of 1.014 to 1.018, an IBU of 15 to 25, an SRM of 17 to 20, an alcohol percentage by volume of 4.5% to 5.4%, and non-limiting examples include Hacker-Pschorr Brau's Munchner Dunkel and Pennsylvania Brewing Company's Penn Dark.

Ale type beers include for example Barley Wines that are a very intense and a complex beer with an alcohol content equal to most wines. These Barley wines have sweet malt flavor offset by a strong bitter flavor from the hops, colors ranging from copper to medium brown. Barley wines typically have an OG of from 1.09 to 1.12, a FG of 1.015 to 1.020, an IBU of 50 to 100, a SRM of from 14 to 22, and alcohol percentage by volume of from 6% to 12%, and non-limiting examples include Sierra Nevada's Bigfoot Barley Wine and Adnam's Tally-Ho Barley Wine.

Another ale type beer is the classic English Bitter type that is usually available in Ordinary/mildly bitter, Special/moderate strength of bitterness, and Extra Special/strong bitter. These beers are typically characterized with hops such as Kent Goldings, Fuggles or Brewer Gold. English Bitter type ales traditionally have an OG of from 1.039 to 1.042, a FG of from 1.006 to 1.012, an IBU of from 28 to 46, a SRM of from 12 to 14, and alcohol percentage by volume of from 4.2% to 4.8%, and non-limiting examples include Young's London Special Ale and Fuller's London Pride. Pale ale is another style of ale that has a pronounced hop flavor and low to medium maltiness, and fair amount of fruity esters. Pale ales typically include an OG of from 1.050 to 1.070, a FG of from 1.012 to 1.018, an IBU of from 40 to 60, a SRM of from 8 to 14, an alcohol percentage by volume of from 5.0% to 7.6%, and non-limiting examples include Anchor Brewing Company's Liberty Ale, Sierra Nevada's Pale Ale, and Samuel Smith's Pale Ale.

Another ale includes the Scottish Ales that are similar to the English Ales; each Scottish ale has a different gravity and strength. Scottish ales typically have an OG of from 1.035 to 1.040, a FG of from 1.010 to 1.014, an IBU of from 12 to 20, a SRM of 10 to 18, an alcohol percentage by volume of from 5.0 to 7.6, and non-limiting examples include Samuel Smith's Mac Andre's Stock Ale and Scottish Courage's McEwans Export. Belgian Strong Dark Ale is another type of ale that is usually dark, have a high alcohol content, and very malty, with a low hop flavor and aroma. Belgian Strong Dark Ale typically have a OG of from 1.064 to 1.0096, a FG of from 1.012 to 1.024, an IBU of from 20 to 50, a SRM of from 10 to 20, an alcohol percentage by volume of 7.0% to 11.0%, and non-limiting examples include Bieres de Chimay Grand Reserve and Brouwerij Westyleteren's Westyleteren Abt 12.

Another ale is known as Porter ale that is typically a mixture of beers that is full flavored, dark without much bitterness, oftentimes referred to as Stout Porter beers. Porter beers have an OG of from 1.045 to 1.060, a FG of 1.008 to 1.016, an IBU of from 25 to 40, and SRM greater than 30, an alcohol percentage by volume content of from 4.5% to 6.0%, and non-limiting examples include Anchor Brewing Company's Anchor Porter, Samuel Smith's Taddy Porter, Fuller Smith and Turner's Fuller's London Porter. Another ale type beer is known as Imperial Stout that is a dark copper color to very black color, very rich and malty, and full flavored and intense. Imperial Stout beers have an OG of from 1.075 to 1.090, a FG of from 1.020 to 1.030, an IBU of from 50 to 80, a SRM of greater than 40, an alcohol percentage by volume of from 7.0% to 9.0%, and non-limiting examples include Grant's Imperial Stout and Samuel Smith's Imperial Stout.

Specialty beers include Weizenbier, an ale made from wheat that has a golden color and is usually cloudy with hints of the flavor of cloves and bananas. Weizenbier has an OG of from 1.046 to 1.056, a FG from 1.008 and 1.016, an IBU of from 10 to 15, a SRM of from 3 to 9, an alcohol percentage by volume of from 5.0% to about 5.6%, and non-limiting examples include Brauerei Weihenstephan's Weihenstephaner Hefeweisbier and Hacker-Pschorr Brau's Hacker-Pschorr Weisse. Other specialty beers include Smoked Beer such as Alaskan Brewing Company's Alaskan Smoked Porter, Fruit/Vegetable beers such as New Glarus Brewing Company's Wisconsin Belgian Red, and a Herb/Spice beer such as Highland Brewing's Cold Mountain Winter Ale.

In one embodiment, the consumable alcohols and blends, preferably beers, of the invention include one or more ales and lagers, more particularly blends of two or more ales or blends of two or more lagers, more preferably an old beer with a new beer. In another embodiment, one or more ales is blended with one or more lagers, one or more ales from one region are blended with one or more ales from a different region, one or more lagers from one region are blended with one or more lagers from one or more different regions, and the like.

In a preferred embodiment, the blends include blends of one or more, preferably two or more beers of any of the group consisting of American Lager, Pilsner, Belgian Strong Dark Ale, Porter, Imperial Stout, Helles, Dunkel, Bock, Oktoberfest, Pale Ale, Scottish Ale, Barely Wine, English Bitter, Weizenbier, Smoked beer, Fruit/Vegetable beers, and Herb/Spice beer. On example of a well-known beer blend is referred to as a Black and Tan, which is a mixture of a Stout (Guiness) with an Ale (Bass Ale). In one embodiment, it is preferred to produce blends of beers having one or more, preferably two or more, and most preferably three or more different properties. In addition to the properties described above for example, OG, FG, IBU, SRM and alcohol content, many of the properties discussed for wines apply. For additional discussion on types of beers and manufacturing beers see Michael Jackson, *Michael Jackson's Great Beer Guide*, published by Dorling Kindersley Publishing, Inc., and Ray Daniels, *Designing Great Beers: The Ultimate Guide to Brewing Classic Style Beers*, published by Brewers Publications, which are both fully incorporated herein by reference.

Scotch Types

There are a variety of different Scotch whiskies available. Grain whiskies are produced in a continuous distillation process from wort essentially made up from wheat or maize, including a very limited proportion of malt. Malt whisky is usually produced exclusively from the distillation of a wort of a malt, usually in pot stills.

Single Malt Scotch Whiskey is the product of one distillery that has not been mixed with whiskey from any other distillery. A Single Grain Scotch Whisky is the product of one Grain distillery made from wheat, corn or unmalted barley. A Pure Malt Scotch Whisky contains a number of malt whiskies that have been blended together for example, blending differently aged whiskies from the same distillery. Blended Scotch Whisky may contain up to 40 to 50 whiskies of different malt and grain distilleries, having from about 60% to 40% ratio of malt to grain. The malt typically determines quality and smoothness of taste and character, and the blending process normally have blends that are older than 5 years, preferably greater than 10 years, even more preferably greater than 15 years. In one embodiment, the Scotch whiskey's and blends thereof are mixtures of various Single Malt Scotches, or blends of Blended Scotch whiskies, or combinations thereof. In a most preferred embodiment, differently aged Single Malt Scotch Whiskies are blended, preferably the ages of the Single Malt Scotch Whiskies are in the range of from 1 year to 30 years, preferably from about 5 years to 25 years, and most preferably from about 5 years to 20 years. Blending Single Malt Scotch whiskies with differently aged whiskies in the appropriate ratio using the combinatorial process of this invention provides for the capability to improve the quality of younger Single Malt Scotch Whiskies. In another embodiment, whiskies of different alcohol content are blended together, wherein the percentage of alcohol is the amount of pure alcohol contained in the whisky, typically referred to for example as 40% abv, a whiskey that contains 40% pure alcohol. In another embodiment, a cask strength whiskey is blended with another cask strength whiskey or another Single or Blended Scotch whiskey. Cask strength refers to a whisky that has not been diluted with water, and is bottled as the original alcohol abv directly from the barrel. A majority of the alcohol content of a whisky is ethanol and the remainder is water. Therefore, water can be used to reduce the alcohol content of a whiskey.

Non-limiting Scotch whiskies are produced in the regions of the Highlands, Campbeltown, Lowlands, Speyside and Isley. There are many types of Scotch whiskies some of different ages including but not limited to An Cnoc, Auchentoshan, Balblair, Balvenie, Blairmhor, Bowmore, Bunnahabhain, Cragganmore, Dalwhinnie, Glennfiddich, Glenkinchie, Highland Park, Lagavulin, Laphroaig, Macallan, Macallan 18, Oban, Old Pulteney, Speyburn, Taliskar, Ballintines, Bell's, Catto's, Cutty Sark, Famous Grouse, Green Plaid, Hankey-Bannister, J&B Rare, Macarthurs, Pinwinnie, Teacher's, Whyte & Mackay. For additional information on Scotch whiskies and making Scotch whiskies see Moss, et al, *The Making of scotch Whisky*, published by Canongate Books, Ltd, 2000, and Michael Jackson, *A Complete Guide to Single Malt Scotch*, $4^{th}$ Edition, published by Running Press Book Publishers, Philadelphia, Pa., which are both fully incorporated herein by reference.

Property and Characteristic Testing and Measurement

There are many properties and characteristics of consumable alcohols, preferably wine and components thereof, that are measurable or capable of being tested. Below are non-limiting examples of tests or measurements that would be useful in comparing, manufacturing, storing/cellaring and blending, of in particular wines and wine blends.

One such property is the color of the wine, which is important in analyzing a wines quality. Typically young wines have a lighter color, while older wines have a deeper, darker or richer color. White wine colors include pale-yellow green, straw yellow, yellow-gold, gold, old gold, yellow-brown, and brown. Red wine colors include purple, ruby, red, brick red, red-brown, and brown. It is well known in the art to utilize light absorbance spectrum analysis to measure color properties. These techniques are well known in the art of using spectrographs or spectroscopes that are capable of measuring different colors using wavelengths. This light measuring technology is well known and used in the field of combinatorial science.

For example in one embodiment, the color of a wine blend is modified or changed using varying amounts of Cabernet Franc to, for example, Cabernet Sauvignon and/or Merlot. However, too much Cabernet Franc can increase acidity, therefore the amount utilized in wine blends should be less than a third of the total wine blend composition. In this regard using the combinatorial process of this invention, it would possible to potentially raise the level of Cabernet Franc without substantially increasing the acid content of the wine blend. Other methods for adjusting the color of a wine or wine blends include using for example a wine teinturier variety, such as Alicante Bouschet, Colobel, Rubired, Royalty, dye, fining agents such as polyvinylpolypyrrolidone, gelatin, and the like.

Non-limiting examples of other important consumable alcohol properties, particularly in the manufacture and storage of wines, include grape ripeness, sugar content, acid levels, and pH levels. These properties are measured by many well known techniques. Acidity is typically measured using a titratable acidity test; sugar content is measured using a hydrometer, and pH using a pH meter.

The Person Square method described on page 106 in *The Complete Handbook of Winemaking*, published by G. W. Kent, Ann Arbor Mich., 2002, which is fully incorporated herein by reference, is useful in determining the amount of different consumable alcohols having one or more different properties or characteristics, preferably wines or components thereof, useful in achieving a particular wine blend having a particular one or more properties or characteristics. For example, beginning with two wines having acidity contents of 0.90% acid and 0.20% acid, respectively, wine A and wine B. To achieve a wine blend having a 0.60% acid content the following equations are solved: $X=0.60-0.20$ and $Y=0.90-0.60$, resulting in $X=0.40$ and $Y=0.30$ such that the amount of wine A to wine B to form the wine blend having a 0.60% acid content is 0.30 to 0.40 or 3 parts of wine A to 4 parts of wine B. This technique is useful with many other properties or characteristics in addition to acidity such as color, sugar content, etc, and more details are found at page 107 of the book incorporated by reference immediately above.

In another embodiment, the acidity of a wine is determined by the blending of a wine from a grape grown in a hot climate or season with a wine from a grape grown in a cooler climate or season. For example to reduce the acidity of a wine in one embodiment, a wine from the hot climate grape is used to change, modify or adjust the acid content of the wine blend. Also, water can be added to dilute the alcohol content, although this method is not preferred.

A hydrometer can be used to determine percentage of sugar in the wine, often called Brix or degrees Balling. The presence of sugar raises the specific gravity of the wine above that of distilled water. See, Jeff Cox, *From Vines to Wines, The Complete Guide to Growing Grapes and Making Your Own Wine*, Storey Books, $3^{rd}$ Edition, 1999 (Cox), which is herein fully incorporated by reference. Cox's book on page 97 through 100 describes measuring the percentage of sugar. In a preferred embodiment the Brix level is in the range of from about 18 to about 24, preferably from about 19 to 24, even more preferably from about 21 to about 24, and most preferably from about 22 to about 24.

Titratable acidity (TA) is defined to be the measure of total acid in the wine expressed as the tartaric acid content. Measuring this property is well known in the art, and one embodiment is described on pages 100 through 102 in the Cox book above that has been fully incorporated herein by reference. One way in which TA is measured involves neutralizing an amount of wine with an accurately measured saline solution, usually phenolphthalein.

Another important property of wine is the pH, which is a measurement of the number of free ($H^+$) hydrogen ions in a solution. The measurement of pH is different from titratable acidity, which relates to the level of tartaric acid. In a preferred embodiment, the pH of the wines of the invention or the blends of consumable alcohols, in particular blends of wine have a pH in the range of about 3 to 5, preferably from about 3.1 to about 3.2 for white wines, and about 3.4 for red wines. Also, for more details on pH, see Cox at pages 102 and 103, which is fully incorporated herein by reference. The pH of a wine or wine blend is adjusted in one embodiment by the addition of a strong mineral acid, preferably a strong mineral acid that is highly ionized, for example phosphoric acid. In another embodiment, a wine with a lower pH is utilized in a higher proportion with another wine of a lower pH to form a wine blend of a desired pH level.

Alcohol content of a consumable alcohol, preferably a wine or a wine blend, provides for various attributes in the consumable alcohol, preferably a wine. For example, a higher alcohol content wine reduces the chance of the wine spoiling, adds sweetness, reduces acidity, increases viscosity of the wine, etc. Therefore, using the Person Square method above, for example, wines of different alcohol content are mixed to form a wine blend having a desired alcohol content.

In addition, various ratios between these few variables also provide valuable information as to the properties of a consumable alcohol, preferably a wine or a wine blend. For example, the Brix:TA ratio is one measure of ripeness of the feed material, wines, blends of wines, or consumable alcohols. See Cox at pages 103 through 105. The Brix:TA ratio is preferably in the range of from 20:1 to 40:1, more preferably from about 25:1 to 40:1, and most preferably in the range of from 30:1 to 35:1. Also described in Cox at pages 104 and 105 is another property of ripeness using pH and Brix as described above. To determine this particular property the Brix is multiplied by the pH giving pH*; pH* is multiplied by Brix, the result of this for a white wine should be about 200, and about 260 for a red wine. It is within the scope of this invention that other combinations of properties will provide information on the quality of a consumable alcohol.

Other measurable properties of the consumable alcohols include viscosity, dielectric, solubility, density, boiling point, dipole moment, freezing point, heat of vaporization, refractive index, and sulfite content ($SO_2$). Sulfite is typically added to wines to prevent oxidation, and the amounts in consumable alcohols, in particular wines, are often regulated, for example in the United States, by the Food and Drug Administration (FDA). The FDA allows up to 350 ppm of sulfite in wine. It is preferred that the upper limit for red wines is 175 ppm and 225 ppm for white wines. Sulfite content is simply a measure of how much sulfite is added. Too much $SO_2$ can destroy other properties of the wine such as the tannins and flavor. Also, as is described in Cox on pages 120 through 122, certain ppm's of $SO_2$ are preferred with certain pH's. It is preferable to have as little $SO_2$ in the wines or blend of wines as possible. Preferably the amount of $SO_2$ in the wine or blends of wines is less than 100 ppm, preferably less than 75 ppm, and most preferably less than 50 ppm.

All of these properties discussed above are adjustable and changeable by techniques well known in the art. For example, sugar in the form of d-Glucose or fructose can be used to adjust alcohol content; water for dilution; bacteria such as malolactic bacteria to convert various chemicals in the wine or wine blends; alkaline materials, such as calcium carbonate, to adjust acidity of the wine and blends of consumable alcohol; and acidity can be adjusted by adding tartaric acid, etc., to name a few. Cox on pages 118 through 128 describes many of these techniques in further detail, and has been already fully incorporated herein by reference.

In addition to the tested properties above, the consumable alcohols used in the invention, preferably wine and wine blends and components thereof, in a preferred embodiment are subjected or tested using one or more or a combination of well known techniques such as IR, far IR, V, visible or Raman spectroscopy, refractive index, acoustical measurement compression testing, viscometry, light scattering, nuclear magnetic resonance (NMR), gel permeation chromatography (GPC), thermogravimetric analysis (TGA), dynamic mechanical analysis (DMA), x-ray diffraction (XD), mass spectroscopy or mass spectral analysis (MS), impedance measurements, ultrasonics, and the like. Most all of these techniques have been applied in the field of combinatorial chemistry today.

In one preferred embodiment, NMR is used to determine the chemical make-up or signature for a composition of a consumable alcohol, preferably where the consumable alcohol is a wine or wine blend, or single or blended Scotch whiskies. NMR is well known in the art. Using NMR it is believed that components in the wine or Scotch would be linked to properties of a high quality consumable alcohols, especially wine or wine blend, or Scotch of Scotch blends.

Many of these and other technologies for testing of properties and describing combinatorial chemistry, technology and equipment are described in U.S. Pat. Nos. 6,670,298, 6,668,622, 6,667,376, 6,667,009, 6,664,067, 6,662,635, 6,662,635, 6,658,429, 6,655,194, 6,653,138, 6,644,101, 6,605,473, 6,582,116, 6,577,392, 6,572,750, 6,566,461, 6,553,318, 6,548,026, 6,544,396, 6,541,271, 6,535,824, 6,535,284, 6,531,041, 6,528,026, 6,519,032, 6,507,945, 6,494,079, 6,491,816, 6,484,567, 6,477,479, 6,462,816, 6,461,515, 6,441,901, 6,439,036, 6,436,292, 6,416,663, 6,393,898, 6,373,570, 6,371,640, 6,345,528, 6,296,771, 6,187,164, 6,175,409, 6,157,449, 6,151,123, 6,087,181, 6,034,775, 5,959,297 and 5,776,359, which are all herein incorporate by reference. These references all describe the use of combinatorial technologies with various chemistries, in polymer testing, and in catalyst synthesis. However, these references do describe various pieces of equipment, software, and methods that are useful in the present invention. In addition, much of the equipment described in these references has been designed for highly reactive chemistries requiring special materials, pressure and temperature tolerances, etc. It is believed that the overall designs discussed in these references can be simplified for use in this invention because the equipment utilized need not be capable of withstanding high pressures and temperatures, and tend not to react with the materials used to make the equipment.

Example Apparatus

There are many different designs for the apparatus useful in this invention. A general description of an apparatus useful in this invention, in one embodiment of the apparatus, includes: multiple feed vessels containing the feed material(s) to be used. These feed material(s) include the feed materials or liquids, specifically various consumable alcohols, including wines, blends of wine, pure variety wines, standards, musts (grape juices), components and control materials such as sugar, water, bacteria, acid, and alkaline materials. The feed material is best contained in the feed vessels that are under a substantially constant environment, for example, in a preferred embodiment, the feed material is stored under a blanket of nitrogen. It also preferred that the feed vessel is made of a material that does not materially alter the feed material such as plastic or preferably stainless steel. Also, the feed vessels include any equipment capable of holding a solid, liquid or gas, preferably a liquid, and non-limiting examples include containers, tubes, electronic wafers, reactors, etc. Using one or more pump(s) to control the amount of feed material needed, the feed material is then pumped or introduced to one or more vessel(s) or one or more mixing vessel(s), preferably two or more vessels, more preferably five or more vessels, even more preferably 10 or more vessels, yet even more preferably 20 or more vessels, still yet even more preferably greater than 50 vessels, and most preferably greater than 100 vessels, preferably greater than 150 vessels. In a preferred embodiment, the apparatus is designed to be a parallel process. The vessel(s) including the feed vessel(s) in one embodiment contain stirrers and/or are placed in an environment in which the temperature, relative humidity, pressure, etc. can be manipulated. The apparatus of the invention in one embodiment is a series process wherein the feed materials are added to the mixing vessel one at a time, or introduced separately, or a parallel process and are added together or simultaneously. The mixing vessel(s) and the feed vessel(s) are made of any material including but not limited to glass, plastic, aluminum, steel, stainless steel, and various woods such as oak. The mixing vessel(s) and feed vessel(s) could even be manufactured in the case of testing wines out of old or new wooden barrels used to store or cellar wines. In one embodiment, it is preferred that the material of which the mixing vessel is made or interior of which is coated does not significantly react with the liquids or feed materials placed therein. Using the various well known techniques the properties and characteristics of the liquid(s) or material(s), consumable alcohol(s), in the mixing vessels are tested and measured. These liquid(s) and material(s) are tested in situ the mixing vessel(s) or sample(s) in the mixing vessel(s) are withdrawn. Ultimately, the results of the tests and measurements are entered into a computer for analysis, especially comparative analysis, particular using well known informatics software.

Sensory Testing

In one preferred embodiment, the remaining contents of the mixing vessel or a portion of the contents of the mixing vessel is removed prior to testing, and is set aside for sensory testing by a person skilled in the art. These persons in the art are capable of evaluating for example wines using terms such as color (different from the scientific measurement described above); by swirling the wine to increase contact with oxygen to release for example the ester, ethers, and aldehydes, thus, yielding the bouquet of the wine; by smelling and tasting the wine to determine its sweetness, fruit character, acidity, tannin, and aftertaste. For example wines are sometimes described by aromas and tastes such as acetic, bright, corky, green, nutty, tart, seductive, rich, chalky, earthy, bitter, and including descriptions such as "smooth finish", "flavored with vanilla, blackberry, raspberry, plum, tobacco, etc.".

These persons of skill in the art of analyzing these sensory properties and characteristics, in particular of wines, typically will provide ratings that would also be useful alongside the scientific results. These ratings are different depending on the system used. The two most widely known rating system are one by Robert M. Parker Jr.'s, *The Wine Advocate Bimonthly Guide to Fine Wines*, and the other by *Wine Spectator* magazine, a Publication of M. Shanken Communications, Inc. The higher the score, referred to as the number of points, the better the sensory properties. The Parker rating system is as follows: usually a score of 50 to 59 points is where the wine is deemed unacceptable, 60 to 69 points the wine is below average in that it contains deficiencies such as excessive acidity, absence of flavor, or possible dirty aromas or flavors, 70 to 79 points is an average wine, 80 to 89 points is a wine that is above average displaying various degrees of finesse and flavor with no noticeable flaws, 90 to 95 points is an outstanding wine with exceptional complexity and character, and 96 to 100 points are extraordinary wines or classic wines. Wine Spectator's rating system is very similar, in that a rating of 50 to 59 points are poor undrinkable wines, 60 to 69 points are below average wines that are drinkable, but not recommended, 70 to 79 points are average wines that are drinkable with minor flaws, 80 to 84 rated wines are good solid wines that are well made, 85 to 89 rated wines are wines that are very good with special qualities, 90 to 94 points are wines that are outstanding with superior quality and style, and 95 to 100 points are classic or great wines.

The fragrance of a wine in one embodiment is modified or changed using another wine to form a wine blend having a particular fragrance that is stronger, sweater or the like than the wine, such as using a Concord wine from California, or the use of the variety Muscadelle that is used with wines such as Graves, Barsac and Sauternes.

The tannin content of a wine in one embodiment is modified or changed using another wine to form a wine blend having a particular tannin content. For example, Merlot wines, and in some cases Cabernet France and Petit Verdot, tends toward having a substantially reduced tannin content than Cabernet Sauvignon. Therefore, to reduce the tannin content of a Cabernet Sauvignon it is preferred to form a wine blend comprising a Cabernet Sauvignon and one or more of the wines from the group consisting of Merlot, Cabernet Franc and Petit Verdot, or mixtures thereof.

Additional Components and Treatments

Oftentimes it is necessary to add certain additional components to the consumable alcohols utilized in this invention. In particular when making wines or wine blends it may be necessary for well known reasons in the art of fining processes to use one or more of the following additional components: bentonite, calcium bentonite, pectinase, tannin, gelatin, kieselsol, casein, egg, isinglass, blood, mustard meal, milk, Na alginates (sparkaloids), yeasts, yeast rinds, polyvinylpolypirrolidon (PVPP)-Polycar AT, nylon (polyamides), methyl cellulose, ferrocyanide, Cufex-blue fining, ethylene glycol, clays, vodka including any other consumable alcohol, and the like. There are other additional components useful in stabilizing a consumable alcohol, preferably a wine or wine blend. Non-limiting examples of additional components include sulfur dioxide, copper sulfate, citric acid, sorbic acid, malic acid, tartaric acid, metatartaric acid, tannin, vitamin C, vitamin E, Arabic gum (acacia gum), carbon dioxide, nitrogen, oxygen, potassium tartrate, calcium phytate, or sodium hexametaphosphate or polyphosphates, active carbon, decolorizing carbon, ion exchange resins, caramel, glycerin, and the like. Depending on the country in which the wine is being produced there may be regulations that may limit the use of one or more of the above additional components.

In addition to chemical treatments or changes or adjustments, there are a number of physical treatments such as heating, cooling, filtration, ultra-filtration, diafiltration, lateral filtration, centrifugation, stirring, aeration, mixing, agitation, osmosis, reverse osmosis, pasteurization, hot and cold packing, and the like. Other additional components or treatments may include the use of enzymes such as pectolytic enzymes, which provide for malolactic fermentation without the need for bacteria, sulfur dioxide addition to stop fermentation with or without potassium sorbate to control the yeast, hydrogen peroxide to convert sulfur dioxide into sulfates, polyphenols, and the like.

EXAMPLES

In order to provide a better understanding of the present invention including representative advantages thereof, the following examples are offered. However, these examples have not been actually performed, these examples are prophetic examples of embodiments of this invention.

Prophetic Example 1

Various wines would be selected as feed materials for use in the present invention. The feed material would include Cabernet Sauvignon, Merlot and Petit Verdot. The feed materials would then be combined in a variety of proportions or percentages to form blends of wines as shown in Table 1 below. Using combinatorial techniques and equipment as is well known in the art, three or more feed vessels containing each of a Cabernet Sauvignon, Merlot and Petit Verdot feed material would be provided. At least one pump, preferably three metered pumps would pump feed materials from their respective feed vessels to 5 mixing vessels in the proportions outlined in Table 1 below. Percentages are the total percentage by volume of the composition or blend.

TABLE 1

| Trial | Cabernet Sauvignon | Merlot | PetitVerdot |
| --- | --- | --- | --- |
| A | 100% | — | — |
| B | 90% | 10% | — |
| C | 90% | 5% | 5% |
| D | 80% | 20% | — |
| E | 80% | 15% | 5% |
| F | 80% | 10% | 10% |

The properties and characteristics of the blends of wines in the mixing vessels would then be tested and measured and analyzed. In addition, a portion of the blends of wine in the mixing vessel is removed for testing their quality based on one of the sensory rating systems discussed previously in this patent specification. All the data would be analyzed and the best combinations of feed materials would then be determined. The best combinations would then be in one embodiment further analyzed and refined or optimized until the best properties of the wine have been attained. In this way a combinatorial library of wines can be created from which new wines can be added, produced or matched.

Prophetic Example 2

In this Prophetic Example 2, the properties and characteristics of the blends of the feed materials described above in Prophetic Example 1 would be compared to a known high quality wine as a control sample or a standard sample. The objective would be to either substantially duplicate or replicate the known high quality wine's properties and characteristics. All the variables, testing methods, etc. discussed in the specification would be compared. Using the invention would allow the rapid testing of many combinations of feed material(s) to arrive at the same or similar wine or blend of wine as the high quality wine, the control sample.

Another use of the invention in this Prophetic Example 2 would be to test all the wine blends in Table 1 using NMR to correlate qualities, characteristics and properties of a wine with a particular NMR signature. It is predicted that different consumable alcohols, preferably wines and wine blends will have a particular composition of molecules or amount of molecules that will be useful as another variable used in assessing, for example, a wine or a wine blend quality. For example, the levels of different number carbon atom alcohols would be detectable, or levels of esters, ketones, aldehydes, acetaldehyde, and the like would also be detectable. Compilation of these data levels and other related properties would provide information for improving and/or matching various characteristics and properties.

Methods of testing various properties of a consumable alcohol, preferably a wine is discussed in R. J. Clarke, et al, *Wine Flavour Chemistry*, 2004, available from Blackwell Publishing, which is fully incorporated herein by reference, and provides information on comparing various wine properties to various flavors or wine descriptions. Also, see Lopez, et al., *Prediction of aged red wine aroma properties from aroma chemical composition. Partial least squares regression models*, J. Agric. Food Chem. 2003 Apr. 23; 51 (9): 2700-7, which is fully incorporated herein by reference, that discusses a model to predict wine aromas based on its chemical compositions as determined for example by gas chromatography (GC-flame ionization detector and GC mass spectrometry methods). For example, the model determined that positive descriptors for wine correlated to chemicals found in the wine such as vanillin, beta damascenone, or (E)-beta-methyl gamma-octalactone, and negative descriptors for wine correlated in wine to chemicals found in wine such as 4-ethyl and vinyl phenols, 3-(methylthio)-1-propanol, etc. Additionally, Kinton, et al, *Wine Discrimination using Mass Spectral Based Chemical Sensor*, which is fully incorporated herein by reference, Global Analytical Solutions, AppNote February 2003, Gerstal, Inc., Baltimore, Md., discusses various testing methods and models for detecting wine samples with close chemical compositions.

Furthermore, wine analysis equipment and software, WineScan™ FT 120 and FIAstart™ 5000 Systems, are available from Foss A/S in Denmark or Foss North America, Inc., Eden Prairie, Minn. Using this equipment and software the consumable alcohols, especially the wine, wine blends, and components thereof, can be tested for various properties in less than a minute. Among these properties are the contents or detection of one or more of the following: malic acid, volatile acid, pH, Total acid, Density, carbon dioxide, glucose, fructose, ethanol, lactic acid, tartaric acid, total polyphenol index, glycerol, gluconic acid, methanol, sorbic acid, citric acid, ethyl acetate, $TSO_2$ and $FSO_2$. The equipment and software also provides for calibrations for various types of consumable alcohols. The equipment includes a software package for tracking the results. This analytical equipment and software could be easily part of the robotic apparatus for the combinatorial process of the invention.

Prophetic Example 3

The invention would be also useful in making a Scotch whiskey (Scotch), or blended Scotch whiskey. Blended Scotch whiskey is usually a mixture of various aged Scotch's that are then mixed together to form the final blended Scotch that is then distributed for consumption. The invention provided herein is capable of providing the best combination of aged Scotch's to produce the finest final blended Scotch possible. Using the same techniques as described in the previous examples where the feed materials are not wines but varyingly aged Scotch's, it would be possible to use this invention to produce a high quality Scotch. It may even be possible to use less highly aged Scotch to produce the same or similar quality as a Scotch blend comprising the more expensive older Scotch. For example, blends using this invention could be as shown in Table 2. Percentages are the total percentage by volume of the composition or blend.

TABLE 2

| Trial | Scotch Aged 18 yrs. | Scotch Aged 10 yrs. | Scotch Aged 5 yrs. |
|---|---|---|---|
| F | 100% | — | — |
| G | 90% | 10% | — |
| H | 90% | 5% | 5% |
| I | 80% | 5% | 15% |

The properties and characteristics of the blends of Scotch would then be tested and measured and analyzed for the quality of the Scotch, as described above. The data would be analyzed and best combination of feed materials would then be determined. The best combinations would then be in one embodiment further analyzed until the best properties of the Scotch have been attained. NMR of the Scotch would also be used in the analysis and/or comparison with a high quality standard as discussed above in Prophetic Example 2.

Prophetic Example 4

The invention would be also useful in making beers or beer blends. The invention provided herein is capable of providing the best combination of beers to produce the final best-blended beer possible. Using the same techniques as described in the previous examples where the feed materials are not wines or Scotches but different types of beer, in this example an Ale and a Lager. Therefore, it would be possible to use this invention to produce a high quality blended beer. For example, blends using this invention could be as shown in Table 3. Percentages are the total percentage by volume of the composition or blend.

TABLE 3

| Trial | Ale Beer | Lager Beer |
|---|---|---|
| J | 100% | — |
| K | 90% | 10% |
| L | 80% | 20% |
| M | 70% | 30% |
| O | 60% | 40% |
| P | 50% | 50% |

The properties and characteristics of the beer blends would then be tested and measured and analyzed for the quality of the beer, as described above. The data would be analyzed and best combination of feed materials would then be determined. The best combinations would then be in one embodiment further analyzed until the best properties of the beer have been attained. NMR of the beer would also be used in the analysis and/or comparison with a high quality standard as discussed above in the Prophetic Examples above. Various properties and characteristics of beers can be measured such as OG, FG, IBU, SRM and alcohol content as described previously in this patent specification.

While the present invention has been described and illustrated by reference to particular embodiments, those of ordinary skill in the art will appreciate that the invention lends itself to variations not necessarily illustrated herein. Also, the invention described herein would be useful in making consumable vinegars such as balsamic vinegar of various ages, wine vinegars, etc., or blending various consumable oils such as olive oils from various regions, or combinations thereof. For this reason, then, reference should be made solely to the appended claims for the purposes of determining the true scope of the present invention.

I claim:

1. A combinatorial chemistry-related method of making a combinatorial library of wines, the combinatorial chemistry-related method comprising the steps of:
    (a) providing five or more vessels;
    (b) introducing a plurality of wines or components thereof into the five or more vessels forming five or more blends;
    (c) rapidly testing or measuring a property of the five or more blends to produce the combinatorial library of wines by utilizing at least two of nuclear magnetic resonance testing; light absorbance spectrum analysis; hydrometer testing; IR, far IR, UV, visible or Raman spectroscopy testing; acoustical measurement compression testing; viscometry; light scattering; gel permeation chromatography; dynamic mechanical analysis; x-ray diffraction; mass spectroscopy; mass spectral analysis; impedance measurements; and ultrasonics, (d) comparing the rapidly tested or measured property from step (c) to a same or similar property of a standard wine; and (e) producing a target wine based on step (d).

2. The combinatorial method of claim 1 wherein in step (a) 10 or more vessels are provided.

3. The combinatorial method of claim 1 wherein the plurality of wines or components thereof are selected from one or more of the group consisting of red and white wines and combinations thereof.

4. The combinatorial method of claim 1 wherein the five or more blends comprise 50% or more of Cabernet Sauvignon or the five or more blend(s) comprise 50% or more of Chardonnay.

5. The combinatorial method of claim 1 wherein the method further comprises the one or more steps of: changing the environment within or around the five or more vessels, or changing the order of addition of the plurality of wines or components thereof, or changing the percentage of the plurality of wines and combinations thereof present in the five or more blends, or a combination thereof.

6. The combinatorial method of claim 1 wherein the standard wine is a high quality wine having a Wine Spectator rating of greater than 90 points.

7. A combinatorial chemistry-related method of making a combinatorial library of wine, the combinatorial chemistry-related method comprising the steps of:

(a) providing five or more vessels;

(b) introducing a plurality of wines or components thereof into the five or more vessels forming five or more blends;

(c) introducing or changing over time at least one variable affecting the five or more blends;

(d) rapidly testing the five or more blends for two or more properties to produce the combinatorial library of wines by utilizing at least two of nuclear magnetic resonance testing; light absorbance spectrum analysis; hydrometer testing; IR, far IR, UV, visible or Raman spectroscopy testing; acoustical measurement compression testing; viscometry; light scattering; gel permeation chromatography; dynamic mechanical analysis; x-ray diffraction; mass spectroscopy; mass spectral analysis; impedance measurements; and ultrasonics, (e) comparing the two or more rapidly tested properties from step (d) to a same or similar two or more properties of a standard wine; and (f) producing a target wine based on step (e).

8. The combinatorial method of claim 7 wherein in step (a) 10 or more mixing vessels are provided.

9. The combinatorial method of claim 7 wherein the combinatorial library of wine is a combinatorial library of red wine or white wine, wherein the one or more wine components are selected from one or more of the group consisting of red and white wines and combinations thereof.

10. The combinatorial method of claim 7 wherein the five or more blends comprise 50% or more of Cabernet Sauvignon or the five or more blends comprise 50% or more of Chardonnay.

11. A combinatorial chemistry-related method of making a combinatorial library of consumable alcohols, the combinatorial chemistry-related method comprising the steps of:

(a) providing at least ten vessels;

(b) introducing two or more feed materials into the at least ten vessels forming at least ten blends;

(c) rapidly testing or measuring a property of the at least ten blends to produce the combinatorial library of wines by utilizing at least two of nuclear magnetic resonance testing; light absorbance spectrum analysis; hydrometer testing; IR, far IR, UV, visible or Raman spectroscopy testing; acoustical measurement compression testing; viscometry; light scattering; gel permeation chromatography; dynamic mechanical analysis; x-ray diffraction; mass spectroscopy; mass spectral analysis; impedance measurements; and ultrasonics, and (d) comparing the rapidly tested or measured property from step (c) to a same or similar property of a standard consumable alcohol; and (e) producing a target wine based on step (d).

12. The method of claim 11 wherein the two or more feed materials are consumable alcohols.

13. The method of claim 11 wherein the two or more feed materials are selected from one or more of the group consisting of a wine, blends of wine, wine components, Scotch whisky, Scotch whisky blends, Scotch whisky components, lagers, ales, and beer components.

14. The method of claim 11 wherein in step (a) at least 10 vessels to 1000 vessels are provided.

15. A combinatorial chemistry-related method for producing a consumable alcohol, the combinatorial chemistry-related method comprising the steps of:

(a) obtaining one or more property or properties of a standard consumable alcohol;

(b) introducing one or more feed material(s) into five or more vessels forming five or more blends;

(c) rapidly obtaining one or more property or properties of the five or more blends to produce a combinatorial library of consumable alcohols by utilizing at least two of nuclear magnetic resonance testing; light absorbance spectrum analysis; hydrometer testing; IR, far IR, UV, visible or Raman spectroscopy testing; acoustical measurement compression testing; viscometry; light scattering; gel permeation chromatography; dynamic mechanical analysis; x-ray diffraction; mass spectroscopy; mass spectral analysis; impedance measurements; and ultrasonics;

(d) comparing the one or more property or properties of the consumable with the same or similar one or more property or properties of the standard consumable alcohol; and (e) producing a target wine based on step (d).

16. The method of claim 15 wherein the consumable alcohol(s) and standard consumable alcohol are selected from one or more of the group consisting of a wine, blends of wine, wine components, Scotch whisky, Scotch whisky blends, Scotch whisky components, lagers, ales, and beer components.

17. The method of claim 15 wherein the one or more feed material(s) are selected from one or more of the group consisting of wine, Scotch, cognac, port, champagne, grape juice, beer, gin, vodka, rums, must, hops, and tequila.

18. The method of claim 15 wherein the standard consumable alcohol is a wine or wine blend having a 90 point or greater using the Wine Spectator rating system.

19. The method of claim 15 further comprising a step (e) changing one or more property or properties of the five or more blends to be similar to the one or more property or properties of the standard consumable alcohol.

20. The combinatorial method of claim 1, wherein step (c) comprises rapidly testing or measuring the property of the five or more blends through high-throughput screening.

* * * * *